Patented Oct. 19, 1943

2,332,181

UNITED STATES PATENT OFFICE 2,332,181

MANUFACTURE OF CHLORINE DIOXIDE

Edward Cornelius Soule, Niagara Falls, N. Y., assignor to The Mathieson Alkali Works, Inc., New York, N. Y., a corporation of Virginia No Drawing. Application July 15, 1941, Serial No. 402,559

4 Claims. (Cl. 23—152)

My invention relates to improvements in the production of chlorine dioxide from metal chlorates, the alkali metal chlorates, the alkaline earth metal chlorates and the chlorates of other metals forming chlorates.

Conventionally, the generation of chlorine dioxide involves the acidification of a chlorate. This general method is subject to a limitation with respect to chemical efficiency in that the generation of chlorine dioxide is accompanied by the concurrent formation of either chlorine or perchlorates. Also, to the extent that chlorine is a product of the reaction, it contaminates the generated chlorine dioxide. By using oxalic acid as a reducing agent in the reaction, chlorine dioxide substantially free from chlorine can be produced, but the chemical efficiency of the chlorate conversion remains low. The reaction with oxalic acid, moreover, is slow. The actual conversion of chlorate to chlorine dioxide gas substantially free from chlorine as previously obtained has approximated something like one-third to one-half of the chlorate supplied to the reaction. Prior to my discoveries, so far as I know, no method was known for the production of substantially pure chlorine dioxide, and particularly chlorine dioxide substantially free from chlorine, from metal chlorates with substantially complete conversion of the chlorate.

In the process of my invention, a metal chlorate is reacted with a mineral acid strong enough to liberate chloric acid from chlorates, of pH not substantially exceeding 1, and hydrogen peroxide at a temperature not substantially exceeding 70° C. The proportion of hydrogen peroxide used is not critical with respect to the production of chlorine dioxide free from chlorine; for high efficiency with respect to chlorate conversion, the proportion of hydrogen peroxide should be approximately equivalent to that of the chlorate, that is 1 mole of hydrogen peroxide per 2 moles of chlorate ion. Higher proportions of hydrogen peroxide tend to involve losses in decomposition of hydrogen peroxide and tend to involve over-reduction of the chlorate to chloride; lower proportions of hydrogen peroxide involve incomplete conversion of the chlorate. Complete conversion of the chlorate is also promoted by maintaining high concentrations in the region of reaction, particularly with respect to the metal chlorate, and particularly at lower temperatures such as 20°-30° C. At higher temperatures, such as 40°-60° C., high efficiency with respect to chlorate conversion can be obtained with somewhat lower concentrations. Production of substantially pure chlorine dioxide, particularly with respect to chlorine, with substantially complete conversion of the chlorate can thus be accomplished.

Apparently the hydrogen peroxide acts as a selective reducing agent to form chlorine dioxide without formation of chlorine or perchlorates. The specific reducing power of hydrogen peroxide in this reaction appears to be illustrated by the following type equation:

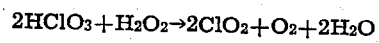

In any event, the reaction can be carried on with close to 100% chemical efficiency according to the foregoing type equation.

The mineral acids useful in the process of my invention include sulfuric acid, hydrochloric acid, nitric acid, phosphoric acid and perchloric acid. To effect substantially complete conversion of the chlorate at temperatures approximating 20°-25° C. for example, the water content of the reaction mixture must be kept at a minimum and, to this end, the mineral acid, the hydrogen peroxide and the metal chlorate solution should be supplied to the reaction mixture in maximum practicable concentrations. In particular, the metal chlorate should be supplied as a substantially saturated aqueous solution; high concentration with respect to the metal chlorate can thus be maintained in the region of reaction immediately adjacent the point of introduction of the metal chlorate even though the reaction mixture as a whole is less concentrated. The use of reactants of high concentration also promotes high reaction rates. At higher temperatures, 50°-60° C. for example, high conversion of the chlorate can be attained with less concentrated reactants; temperatures exceeding about 70° C., however, tend to impair the efficiency of the reaction and to involve dangerous explosive decompositions.

In one particular advantageous embodiment of my invention, I dissolve the metal chlorate in commercial 100 volume hydrogen peroxide in reacting proportion with just sufficient addition of water to complete solution and then introduce this solution, either in small increments or continuously at a low rate, into a substantial excess of the mineral acid of high concentration. The reaction rate being high, the chloric acid is reduced as fast as formed by the hydrogen peroxide introduced with the chlorate to liberate chlorine dioxide substantially free from chlorine. In another less advantageous embodiment of my invention, I introduce a substantially saturated aqueous solution of the metal chlorate, in small increments or continuously at a low rate, into a concentrated mixture of one of the mineral acids other than hydrochloric acid and hydrogen peroxide. I may also introduce the three reactants or the mineral acid and a mixture of the hydrogen peroxide and the metal chlorate, into a generator simultaneously in approximately reacting proportions. Some excess of the mineral acid assists in driving the reaction to completion.

If water is permitted to accumulate in the reaction mixture, through the reduction or through addition with the reactants, the efficiency of the reaction with respect to chlorate conversion tends to decrease. The temperature may be progressively increased up to about 70° C. to offset this tendency within this limit. However, the reaction mixture should be replaced before such accumulating water seriously impairs the chemical efficiency of the process. Limitation of the total water present in the reaction mixture also assists in driving the reaction to completion. Such replacement of the reaction mixture can be carried out, for example, continuously or at regular intervals.

The following examples of operations embodying the process of my invention will further illustrate the invention:

I

This operation was carried out in a glass generator equipped with an agitator, a feeding burette, a thermometer, an air inlet tube and a gas outlet tube. Phosphoric acid, 0.816 mole of commercial 85% $H_3PO_4$, was introduced into the generator. An aqueous solution containing 0.0534 mole of sodium chlorate and 0.0404 mole of hydrogen peroxide in just sufficient water to effect solution was introduced into the generator, through the feeding burette, in small increments over a period of 25 minutes while maintaining the generator at a temperature of 26°–28° C. Air was forced through the generator at a rate sufficient to maintain the partial pressure of the generated chlorine dioxide at 100 mm. of mercury or somewhat less. Chlorine dioxide free from chlorine was produced with decomposition of 97.5% of the total chlorate. The molar ratio of chlorine dioxide generated to chlorate decomposed was 0.950 and the molar ratio of hydrogen peroxide consumed to chlorine dioxide generated was 0.501. About 0.0150 mole of hydrogen peroxide remained unconsumed in the reaction mixture.

II

This operation was carried out in the same apparatus. Sulphuric acid, 1.175 moles of commercial 90% $H_2SO_4$, was introduced into the generator. A substantially saturated aqueous solution containing 0.1740 mole of sodium chlorate and 0.0889 mole of hydrogen peroxide was introduced into the generator in small increments over a period of 35 minutes, with active agitation, while maintaining a temperature of 20°–23° C. Air was forced through the generator at a rate sufficient to maintain the partial pressure of chlorine dioxide below about 100 mm. of mercury. Chlorine dioxide free from chlorine was produced with decomposition of about 98.9% of the total chlorate. The molar ratio of chlorine dioxide generated to chlorate decomposed was 0.99. The molar ratio of hydrogen peroxide consumed to chlorine dioxide generated was 0.521.

III

This operation was carried out in the same apparatus. Nitric acid, 1.00 mole of commercial 70% $HNO_3$, was also introduced into the generator. An aqueous solution containing 0.0534 mole of sodium chlorate and 0.0404 mole of hydrogen peroxide in just sufficient water to effect solution was introduced into the generator in small increments over a period of 35 minutes while maintaining a temperature of 28°–30° C. Air was forced through the generator at a rate sufficient to maintain the partial pressure of chlorine dioxide below about 100 mm. of mercury. Chlorine dioxide substantially free from chlorine was produced with decomposition of 96% of the total chlorate. The molar ratio of chlorine dioxide generated to chlorate decomposed was 0.924, and the molar ratio of hydrogen peroxide consumed to chlorine dioxide generated was 0.811. About 0.0011 mole of hydrogen peroxide remained unconsumed in the reaction mixture.

IV

This operation was carried out in the same apparatus. Hydrochloric acid, 1.56 moles of 38% HCl, were introduced into the generator. An aqueous solution containing 0.534 mole of sodium chlorate and 0.0296 mole of hydrogen peroxide in just sufficient water to effect solution was introduced into the generator, in small increments, with effective agitation, over a period of 30 minutes while maintaining a temperature of 14°–16° C. Air was forced through the generator at a rate sufficient to maintain partial pressure of chlorine dioxide below about 100 mm. of mercury. Chlorine dioxide contaminated with some hydrochloric acid gas and with a trace of chlorine was produced with decomposition of 99.1% of the total chlorate. The molar ratio of chlorine dioxide generated to chlorate decomposed was 0.940 and the molar ratio of hydrogen peroxide consumed to chlorine dioxide generated was 0.601.

V

This operation was carried out in the same apparatus. Sulfuric acid, 1.34 moles of 89.5% $H_2SO_4$, were introduced into the generator. An aqueous solution containing 0.0801 mole of chlorate ion as calcium chlorate and 0.0402 mole of hydrogen peroxide in just sufficient water to effect solution was introduced, in small increments, with effective agitation, into the generator over a period of 40 minutes while maintaining a temperature of 20°–24° C. Air was forced through the generator at a rate sufficient to maintain the partial pressure of chlorine dioxide below about 100 mm. of mercury. Chlorine dioxide containing a trace of chlorine was produced with decomposition of 99.5% of the total chlorate. The molar ratio of chlorine dioxide generated to chlorate (as chlorate ion) decomposed was 0.961, and the molar ratio of hydrogen peroxide consumed to chlorine dioxide generated was 0.627.

VI

This operation was carried out in the same apparatus. Perchloric acid, 0.63 mole of 60% $HClO_4$, was introduced into the generator. An aqueous solution containing 0.0651 mole of sodium chlorate and 0.0357 mole of hydrogen peroxide in just sufficient water to effect solution was introduced, in small increments, with effective agitation, into the generator over a period of 40 minutes while maintaining a temperature of 20°–21° C. Air was forced through the generator at a rate sufficient to maintain partial pressure of chlorine dioxide below about 100 mm. of mercury. Chlorine dioxide containing a trace of chlorine was produced with decomposition of 65% of the total chlorate. This relatively low conversion was the consequence of the relatively low concentration of the perchloric acid. The molar ratio of chlorine dioxide generated to chlorate decomposed was 0.930, and the molar ratio of hydrogen peroxide consumed to chlorine dioxide generated was 0.567.

VII

This operation was carried out in the same apparatus. Sulfuric acid, 1.27 moles of commercial 80.7% $H_2SO_4$, were introduced into the generator. An aqueous solution containing 0.0382 mole of chlorate ion as magnesium chlorate, 0.0234 mole of hydrogen peroxide and .0191 mole of sodium sulphate in just sufficient water to effect solution and slightly acidified with sulfuric acid was introduced into the generator, in small increments, with effective agitation, over a period of 35 minutes while maintaining a temperature of 21°–22° C. Air was forced through the generator at a rate sufficient to maintain partial pressure of chlorine dioxide below about 100 mm. of mercury. Chlorine dioxide substantially free from chlorine was produced with decomposition of 93% of the total chlorate. The molar ratio of chlorine dioxide generated to chlorate (as chlorate ion) decomposed was 0.935, and the molar ratio of hydrogen peroxide consumed to chlorine dioxide generated was 0.705.

VIII

This operation was carried out in the same apparatus. Sulfuric acid, 1.42 moles of commercial 89.7% $H_2SO_4$, was introduced into the generator. An aqueous solution containing 0.02915 mole of chlorate ion as aluminum chlorate, 0.01690 mole of hydrogen peroxide and 0.01458 mole of sodium sulphate in just sufficient water to effect solution was introduced into the generator, in small increments, with effective agitation, over a period of 18 minutes while maintaining a temperature of 23°–25° C. Air was forced through the generator at a rate sufficient to maintain the partial pressure of the chlorine dioxide below about 100 mm. of mercury. Chlorine dioxide substantially free from chlorine was produced with decomposition of 87% of the total chlorate. The molar ratio of chlorine dioxide generated to chlorate (as chlorate ion) decomposed was 0.911, and the molar ratio of hydrogen peroxide consumed to chlorine dioxide generated was 0.634.

IX

This operation was carried out in the same apparatus. Sulfuric acid, 1.10 moles of commercial 92% $H_2SO_4$, was introduced into the generator. An aqueous solution containing 0.03255 mole of chlorate ion as manganese chlorate, $Mn(ClO_3)_2$, 0.01680 mole of hydrogen peroxide and 0.01628 mole of sodium sulphate in just sufficient water to effect solution was introduced into the generator, in small increments, with effective agitation, over a period of 25 minutes while maintaining a temperature of 22°–25° C. Air was forced through the generator at a rate sufficient to maintain partial pressure of the chlorine dioxide below about 100 mm. of mercury. Chlorine dioxide free from chlorine was produced with decomposition of 100% of the total chlorate. The molar ratio of chlorine dioxide generated to chlorate (as chlorate ion) decomposed was 0.940, and the molar ratio of hydrogen peroxide consumed to chlorine dioxide generated was 0.514.

X

This operation was carried out in the same apparatus. Sulfuric acid, 1.42 moles of commercial 88% $H_2SO_4$, was introduced into the generator. An aqueous solution containing 0.0312 mole of chlorate ion as copper chlorate, $Cu(ClO_3)_2$, 0.01365 mole of hydrogen peroxide and 0.0156 mole of sodium sulphate in just sufficient water to effect solution was introduced into the generator, in small increments, with effective agitation, over a period of 35 minutes while maintaining a temperature of 20–24° C. Air was forced through the generator at a rate sufficient to maintain the partial pressure of the chlorine dioxide below about 100 mm. of mercury. Chlorine dioxide substantially free from chlorine was produced with decomposition of 87.1% of the total chlorate. The molar ratio of chlorine dioxide generated to chlorate (as chlorate ion) decomposed was 0.920, and the molar ratio of hydrogen peroxide consumed to chlorine dioxide generated was 0.546.

In the VIIth, VIIIth, IXth and Xth of the foregoing examples, the sodium sulphate was present in the chlorate-peroxide solution as the reaction product of a preceding double decomposition between the sulphate of the metal of the chlorate and sodium chlorate. The generated chlorine dioxide can be recovered from the air mixture in which it is carried out of the generator, in operations such as those of the foregoing examples, in any convenient absorption or recovery system.

I claim:

1. In the production of chlorine dioxide, the improvement which comprises reacting a metal chlorate with a mineral acid of pH not substantially exceeding 1 and hydrogen peroxide at a temperature not substantially exceeding 70° C.

2. In the production of chlorine dioxide, the improvement which comprises reacting a metal chlorate with a mineral acid of pH not substantially exceeding 1 and hydrogen peroxide in proportion approximately equivalent to that of the chlorate at a temperature not substantially exceeding 70° C.

3. In the production of chlorine dioxide, the improvement which comprises reacting a substantially saturated aqueous solution of a metal chlorate with a mineral acid of pH not substantially exceeding 1 and hydrogen peroxide at a temperature approximating 20°–30° C.

4. In the production of chlorine dioxide, the improvement which comprises reacting a metal chlorate with a mineral acid of pH not substantially exceeding 1 and hydrogen peroxide at a temperature approximating 40°–60° C.

EDWARD CORNELIUS SOULE.

CERTIFICATE OF CORRECTION.

Patent No. 2,332,181. October 19, 1943.

EDWARD CORNELIUS SOULE.

It is hereby certified that error appears in the printed specification of the above numbered patent requiring correction as follows: Page 1, second column, line 36, for "conversion" read --conversions--; line 42, for "particular" read --particularly--; page 2, second column, line 28, Example IV, for "0.534 mole" read --0.0534 mole--; and that the said Letters Patent should be read with this correction therein that the same may conform to the record of the case in the Patent Office.

Signed and sealed this 14th day of December, A. D. 1943.

Henry Van Arsdale,
Acting Commissioner of Patents.

(Seal)